United States Patent
De' Longhi

(10) Patent No.: US 8,651,013 B2
(45) Date of Patent: Feb. 18, 2014

(54) DEVICE FOR THE FORMATION OF FROTH IN A MILK-BASED DRINK

(75) Inventor: Giuseppe De' Longhi, Treviso (IT)

(73) Assignee: De' Longhi S.p.A., Treviso (IT)

( * ) Notice: Subject to any disclaimer, the term of this patent is extended or adjusted under 35 U.S.C. 154(b) by 890 days.

(21) Appl. No.: 11/782,211

(22) Filed: Jul. 24, 2007

(65) Prior Publication Data

US 2008/0053314 A1    Mar. 6, 2008

(30) Foreign Application Priority Data

Jul. 26, 2006   (IT) .............................. MI2006A1469

(51) Int. Cl.
*A23F 3/00*    (2006.01)

(52) U.S. Cl.
USPC ....................................................... 99/323.1

(58) Field of Classification Search
USPC ....... 99/323.1, 302 R, 287, 295; 261/DIG. 26
See application file for complete search history.

(56) References Cited

U.S. PATENT DOCUMENTS

| | | | | |
|---|---|---|---|---|
| 4,735,133 A * | 4/1988 | Paoletti | ............................ | 99/454 |
| 4,922,810 A * | 5/1990 | Siccardi | ........................ | 99/323.1 |
| 4,949,631 A * | 8/1990 | Fregnan | ............................ | 99/452 |
| 5,492,054 A * | 2/1996 | Schneeberger | ............... | 99/289 R |
| 5,615,602 A * | 4/1997 | Schmed | ........................ | 99/323.1 |
| 5,862,740 A * | 1/1999 | Grossi | ............................ | 99/293 |
| 6,158,328 A * | 12/2000 | Cai | .................................. | 99/293 |
| 6,968,776 B2 * | 11/2005 | Paoletti | ............................ | 99/353 |
| 7,441,495 B2 * | 10/2008 | Halle et al. | ....................... | 99/295 |

\* cited by examiner

*Primary Examiner* — Yuwen Pan
*Assistant Examiner* — Mark Woodall
(74) *Attorney, Agent, or Firm* — Amster, Rothstein & Ebenstein LLP

(57) ABSTRACT

The device for the formation of froth in a milk-based drink comprises a tubular structure suitable for being connected to a steam-dispensing nozzle, at least one hole for air to pass, formed through the wall thickness of the tubular structure, and an element for adjusting the flow of air through the hole for air to pass.

13 Claims, 9 Drawing Sheets

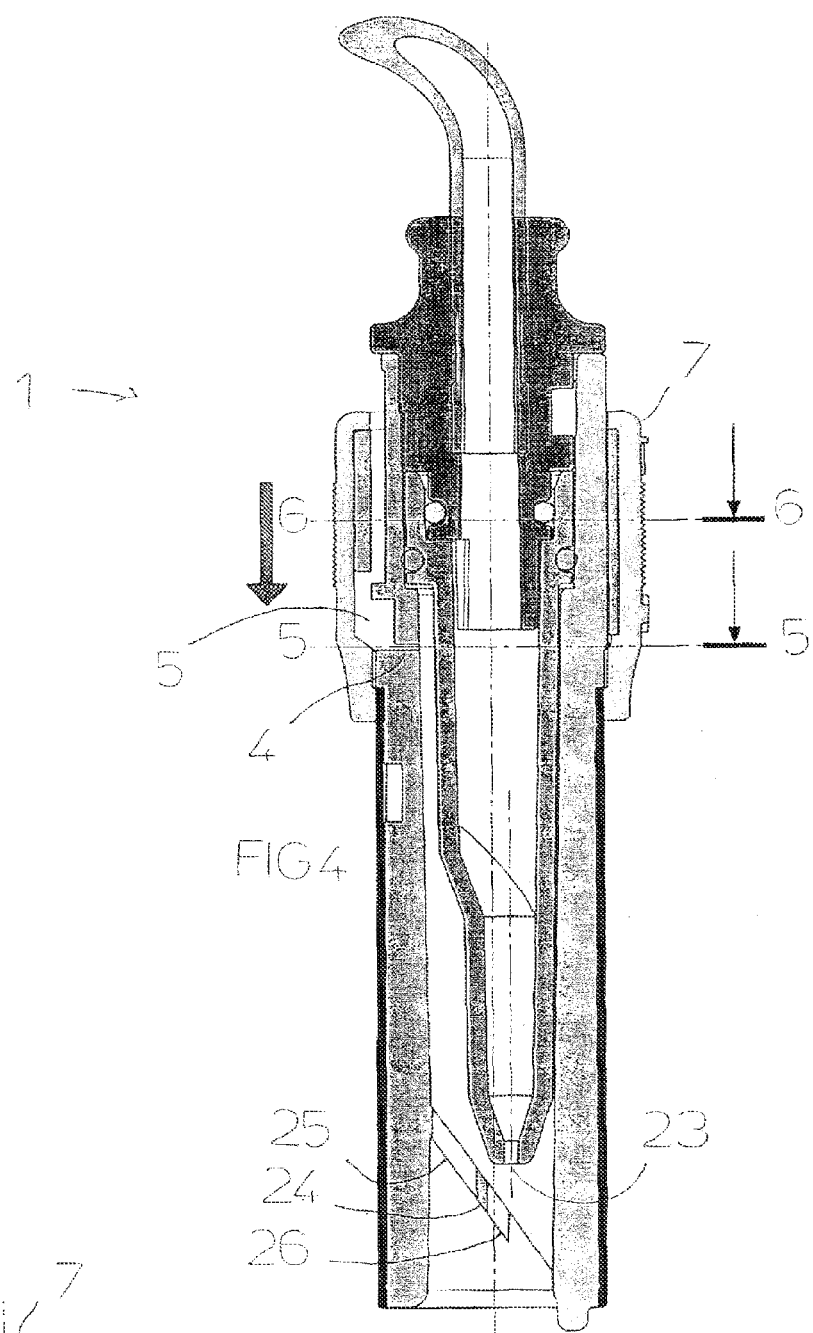
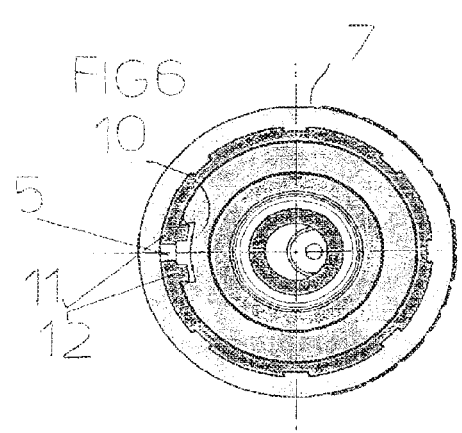
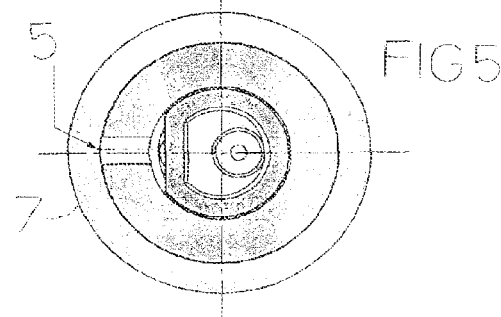

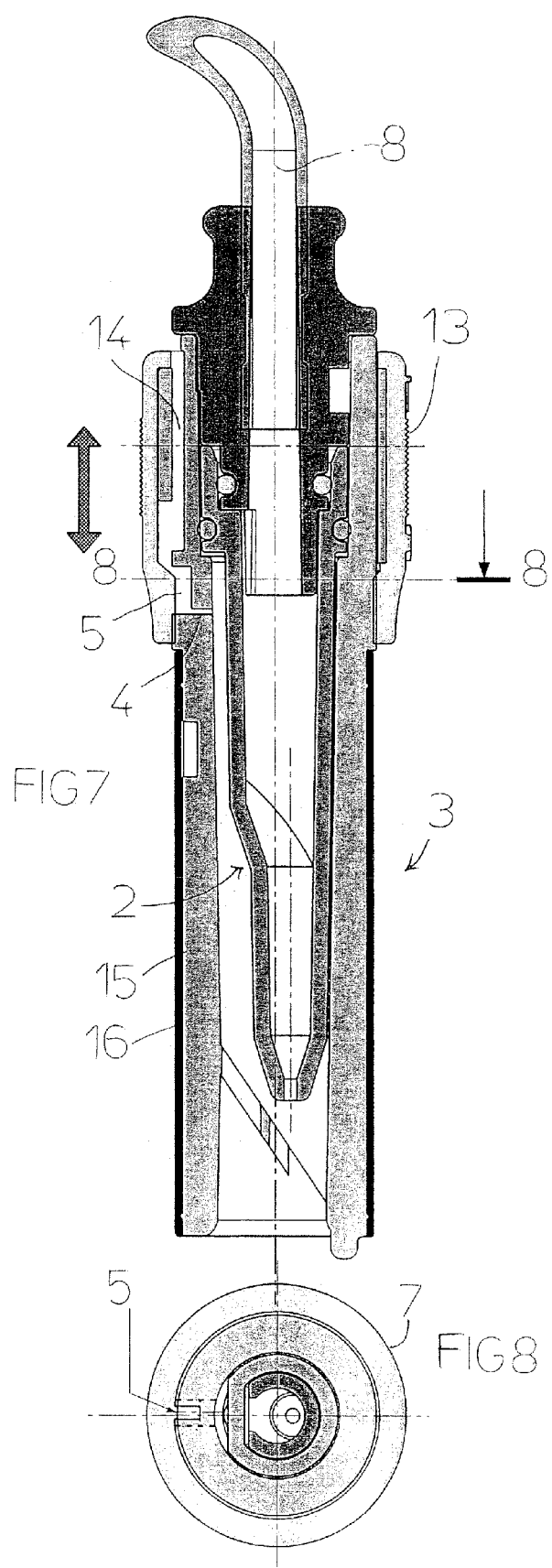

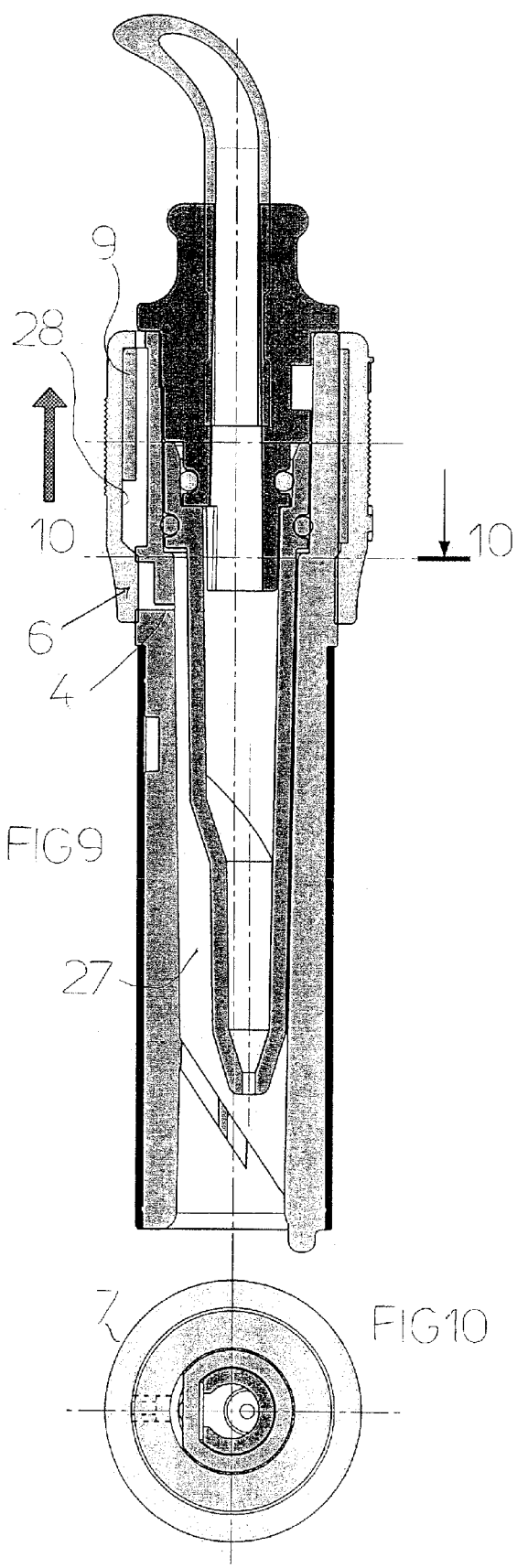

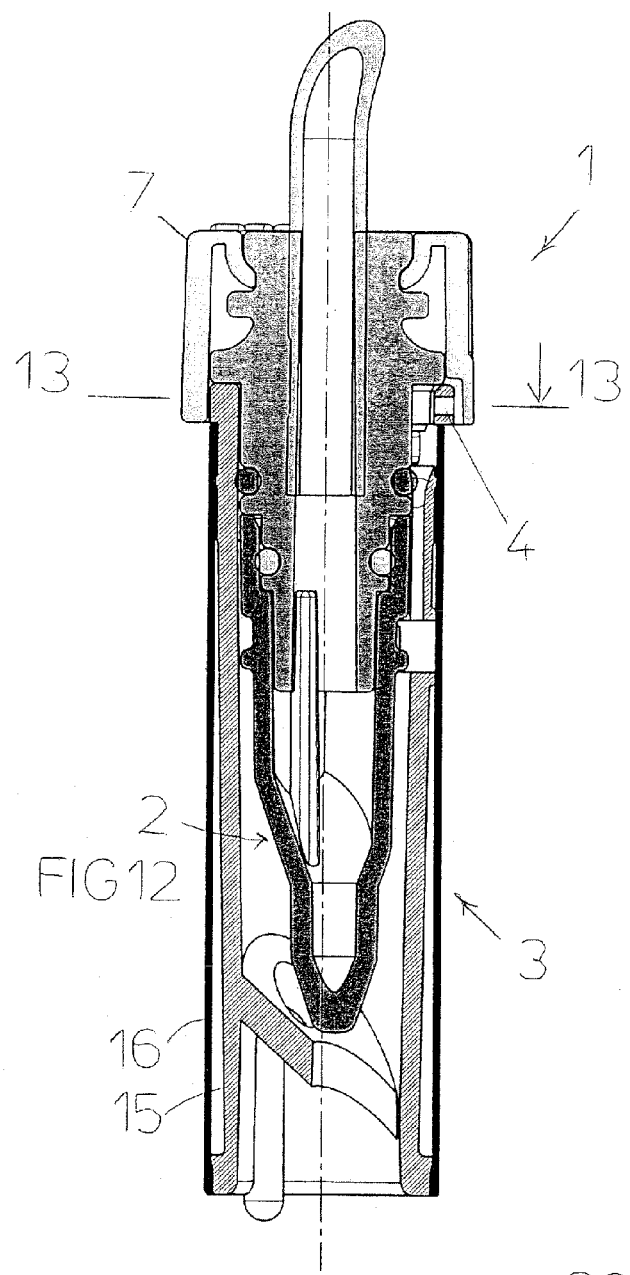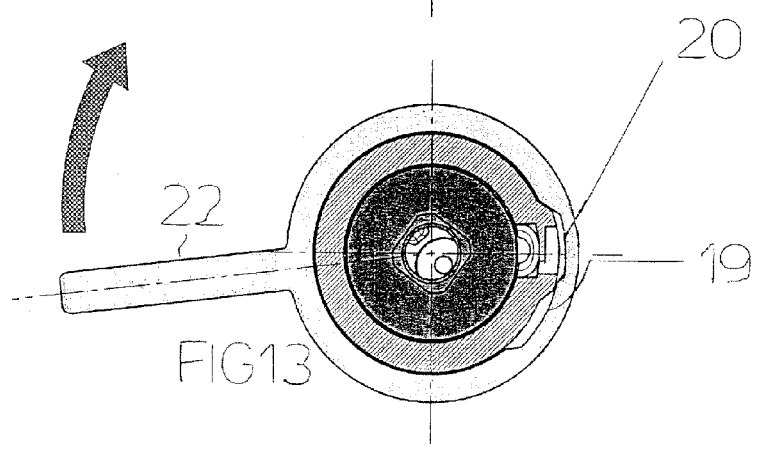

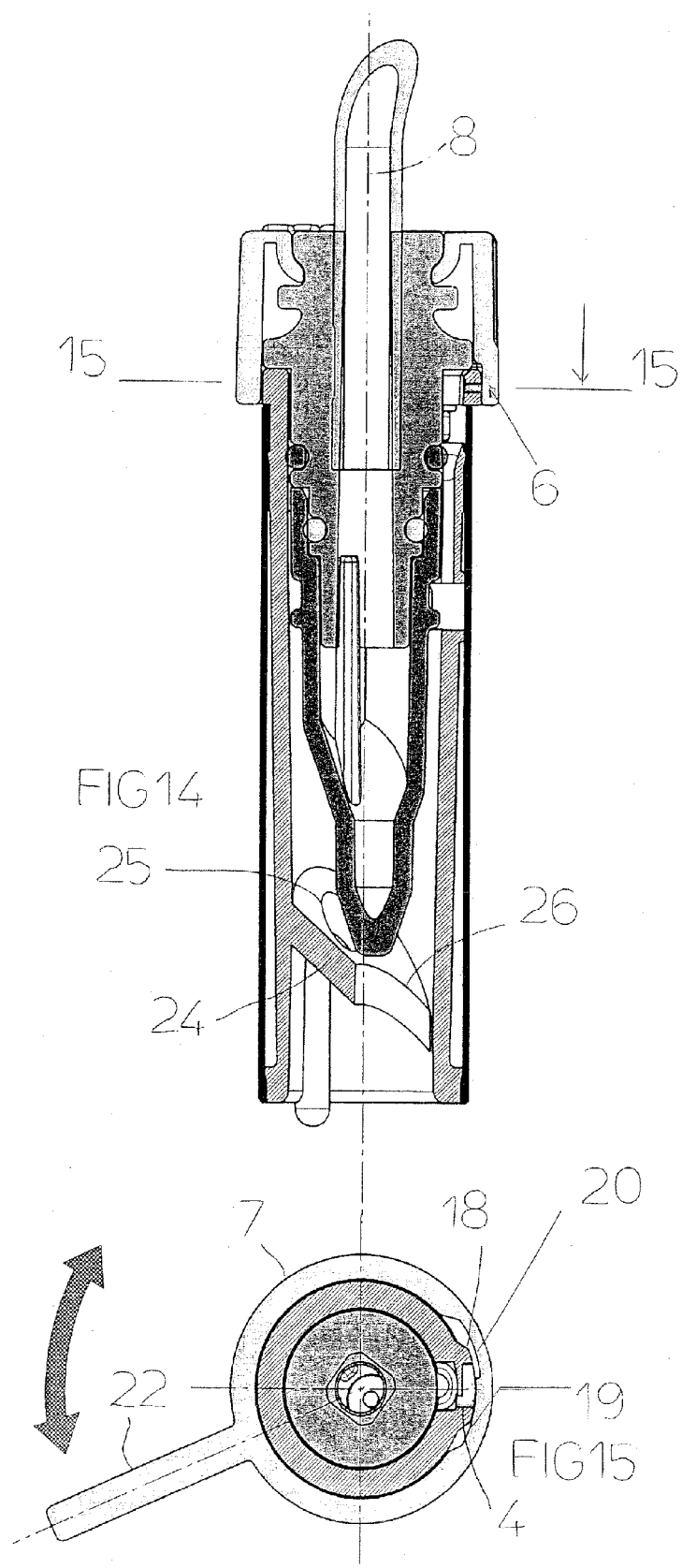

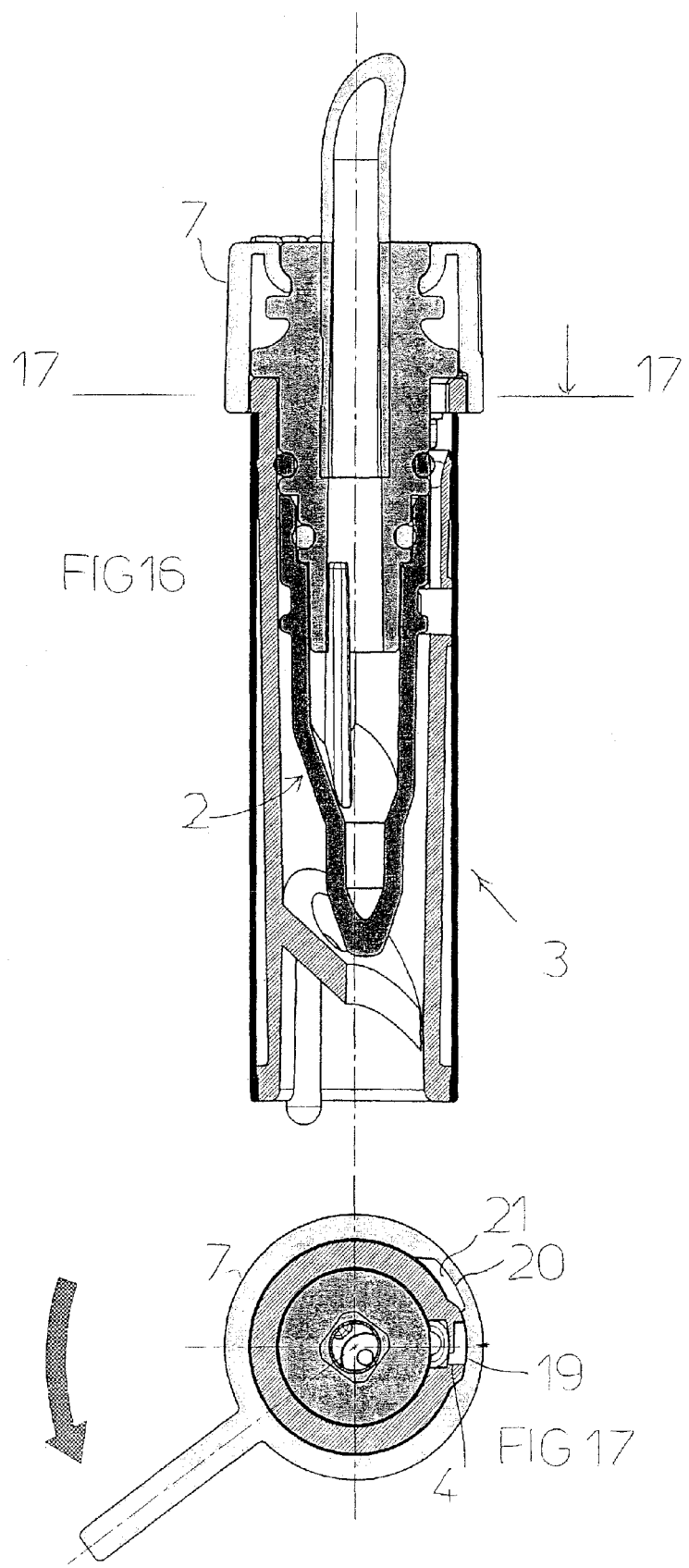

DEVICE FOR THE FORMATION OF FROTH IN A MILK-BASED DRINK

The present invention is in the technical field of devices for the formation of froth in a milk-based drink.

As known, currently, in apparatuses for use at home and professionally for preparing coffee, cappuccino and the like, there is a steam dispenser suitable for mixing milk with air to give the mixture thus obtained, through steam, an emulsion of milk, air and steam that gives soft froth above all for the preparation of cappuccinos and the like.

This emulsifying device is currently make with different structures and with different ways of operating suitable for obtaining optimal mixing of milk with air and, consequently, optimal emulsion of milk, air and steam and, therefore, optimal froth that is sought after in milk-based drinks.

Amongst the drawbacks from which known emulsifiers suffer there is the one due to their intrinsic inability of adjust the flow of air, which does not allow the frothing to be modified between a lower limit in which the drink produced has a minimum or zero amount of froth and an upper limit in which the drink produced has a maximum amount of froth.

In this situation the technical task forming the basis of the present invention is to overcome the aforementioned drawbacks of the prior art.

In this technical task, an important purpose of the present invention is not devise a device for the formation of froth in a milk-based drink that allows the frothing of the drink produced to be adjusted.

Another purpose of the present finding is to provide a device for the formation of froth in a milk-based drink that allows the mixture of milk and air and the emulsion of milk, air and steam to be optimised so as to obtain a consistent and optimal formation of froth.

Yet another purpose of the present finding is a device that allows the emulsion of milk, air and steam obtained by the tubular element in which it has formed to be expelled without having load losses that can damage or reduce the formation of froth, both in terms of quality and quantity.

The last but not least purpose of the finding is to device a device that allows a range of milk-based drinks having different organoleptic properties to be produced.

The aforementioned technical task and the specified purposes are substantially accomplished by a device for the formation of froth in a milk-based drink in accordance with claim 1.

Further characteristics and advantages of the finding shall become clearer from the description of a preferred but not exclusive embodiment of a device for the formation of froth in a milk-based drink, illustrated for indicating and not limiting purposes in the attached drawings, in which.

Figure 3:
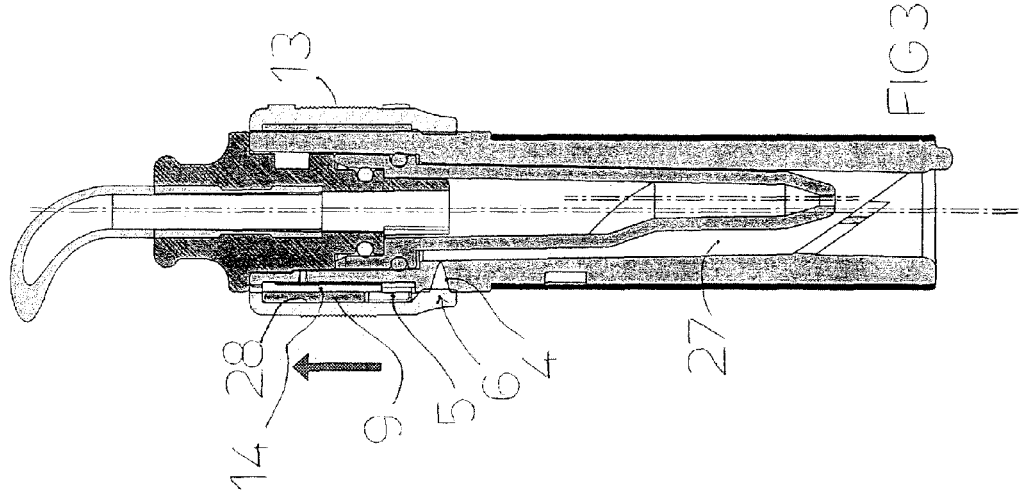
FIG. 3 is a top side view of the device of FIG. 1 axially sectioned, with the adjustment element in the position closing the hole for the passage of air.
Figure 2:
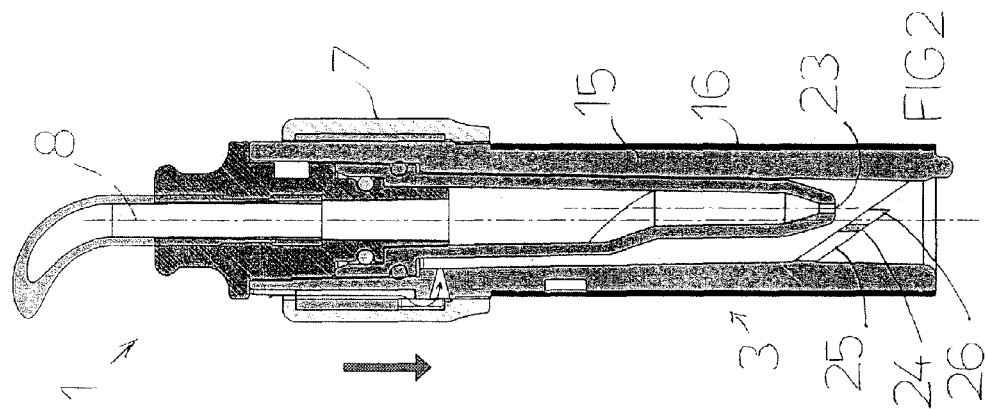
FIG. 2 is a top side view of the device of FIG. 1 axially sectioned, with the adjustment element in the position opening the hole for the passage of air.
Figure 1:
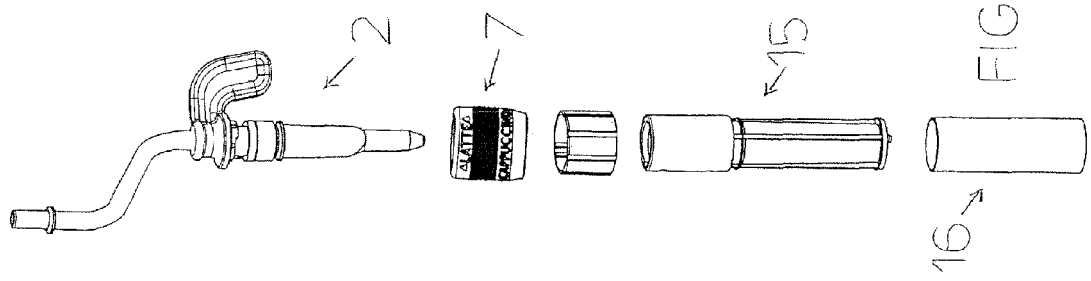
FIG. 1 is an exploded top side view of the device according to a first preferred embodiment of the finding.
Figure 11:
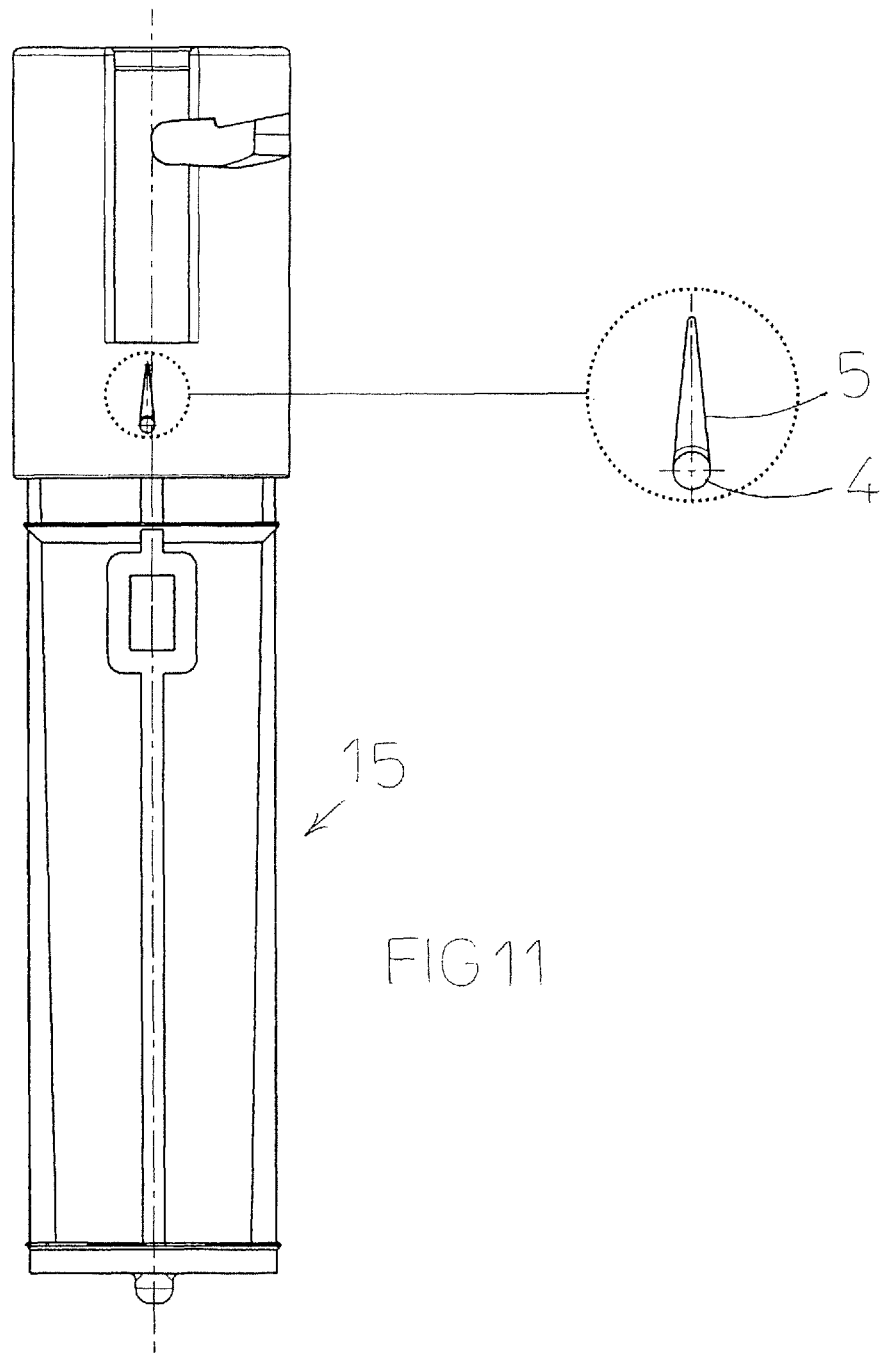

FIGS. 4, 7 and 9, respectively, are a top side axial section view of the device in accordance with a second preferred embodiment of the finding, with the adjustment element in a position completely opening, partially opening and closing, respectively, the air intake;

FIGS. 5 and 6, respectively, are a plan view of the device of FIG. 4 sectioned along the plane 5-5 and 6-6, respectively;

FIG. 8 is a plan view of the device of FIG. 7 sectioned along the plane 8-8;

FIG. 10 is a plan view of the device of FIG. 9 sectioned along the plane 10-10;

FIG. 11 is a top side view of the core of the tubular structure of the device of FIG. 4.

Figure 18:
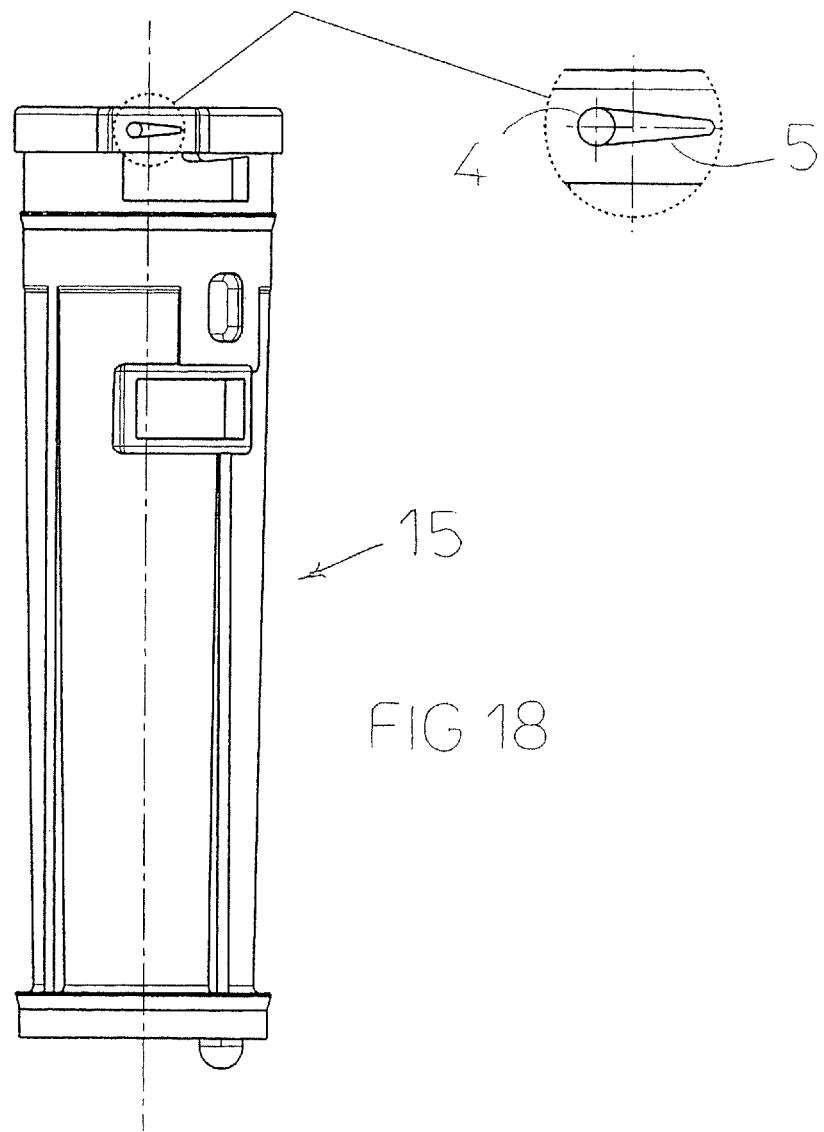

FIGS. 12, 14 and 16, respectively, are a top side axial section view of the device in accordance with a third preferred embodiment of the finding, with the adjustment element in a position completely opening, partially opening and closing, respectively, the air intake;

FIG. 13 is a plan view of the device of FIG. 12 sectioned along the plane 13-13;

FIG. 15 is a plan view of the device of FIG. 14 sectioned along the plane 15-15;

FIG. 17 is a plan view of the device of FIG. 16 sectioned along the plane 17-17;

FIG. 18 is a top side view of the core of the tubular structure of the device of FIG. 12;

With reference to the quoted figures, the device for the formation of froth in a milk-based drink, wholly indicated with reference numeral 1, comprises a tubular structure 3 that can be removably fitted onto a steam-dispensing nozzle 2.

The tubular structure 3 comprises a core 15 and a cylindrical shell 16.

The nozzle 2 is of the type preferably suitable for being connected to a steam-dispensing tap of a coffee machine (not illustrated).

The device 1 has at least one hole 4 for air to pass, formed through the wall thickness of the tubular structure 3 and in communication with an air intake in turn in communication with outside the device 1.

The device 1 also has an element 6 for adjusting the flow of air through the passage hole 4.

The adjustment element 6 is mobile between a closed position and at least one at least partially open position of the air intake 5 (second and third preferred embodiment of the finding) or else between a closed position and an open position of the passage hole 4 (first preferred embodiment of the finding).

The adjustment element 6 is formed on the inner surface of a sleeve 7 fitted on the tubular structure 3, whereas the intake 5 is formed on the outer surface of the tubular structure 3, or vice-versa.

We shall now refer to the first and second preferred embodiment of the finding.

The sleeve 7 is made from elastomeric material, for example rubber, to be firmly connected through pressure fitting to the tubular structure 3.

The inner side surface of the sleeve 7 has a recess 28 in which an annular stiffening band 9 is firmly housed.

Between the stiffening band 9 and the tubular structure 3 there is an interspace 14 that allows the intake to communicate with the outside.

The tubular structure 3 has means for supporting and guiding the sleeve 7 in translation parallel to its axis 8, in this particular case an axial guide groove 10 in which ribs 11, 12 of the inner side surface of the annular stiffening band 9 slidably couple.

The sleeve 7 has a grip knurling 13 on its outer side surface so that it can be actuated in translation.

The sleeve 7 also has a mark indicating the direction of actuation according to the type of drink desired on its outer side surface (for example a double vertical arrow with the word "cappuccino" at the downward-facing point of the double arrow, and with the words "hot milk" at the upward-facing point of the double arrow).

Now with reference in particular to the first preferred embodiment of the finding, the adjustment element 6, positioned at the base of the sleeve 7, is mobile exclusively between two positions suitably indicated as limit switches (not shown): in a first position it is staggered from the hole 4 to open the intake 5, whereas in a second position it directly closes the hole 4. When the nozzle 2 dispenses steam, in the first position of the adjustment element 6 air is drawn inside the tubular structure 3 through the intake hole 4, and in the second position air is not drawn in.

We shall now refer to the second preferred embodiment of the finding.

The intake 5 has a variable section, for example as illustrated substantially triangular.

In this case the intake 5 preferably extends longitudinally parallel to the axis 8.

The adjustment element 6, positioned at the base of the sleeve 7, is mobile between three positions suitably indicated as limit switches (not shown): in a first position it is totally staggered from the intake 5, in a second position it partially overlaps the intake 5 and in a third position it completely overlaps the intake 5. Given the variable section of the intake 5, the degree of overlapping of the adjustment element determines the actual gap for the passage of air and consequently the size of the air flow through the passage hole 4.

When the nozzle 2 dispenses steam, in the first position of the adjustment element 6 there is the maximum intake of air inside the tubular structure 3 through the intake hole 4, in the second position there is the minimum intake of air and in the third position there is no intake of air.

We shall now refer to the third preferred embodiment of the finding.

The intake 5 extends circumferentially to the axis 8 of the tubular structure 3 that in turn has means for guiding and supporting the sleeve 7 in rotation about the axis 8. The guide and support means comprise in particular snap connection members between the sleeve 7 and the tubular structure 3.

The section of the intake 5 is once again preferably triangular. The intake 5 extends along an arched radial projection 18 of the tubular structure 3.

The adjustment element 6 comprises a first recess 19 of the sleeve 7, with a shape matching the projection 18 on which it slides in contact.

Adjacent to the first recess 19 there is a second recess 20 of the sleeve 7, having a greater depth than the first recess 19. The second recess 20, together with the tubular structure 3, defines a chamber 21 in communication with the outside.

The adjustment element 6, positioned at the base of the sleeve 7, is mobile between three positions suitably indicated as limit switches (not shown): in a first position the surface of the first recess 19 completely frees the intake 5 onto which the chamber 21 on the other hand faces, in a second position the surface of the first recess 19 occupies a part of the intake 5 onto which the chamber 21 partially faces, and in a third position the surface of the first recess 19 entirely occupies the intake 5 insulating it from the chamber 21.

Given the variable section of the intake 5, the degree of overlapping of the element of the surface of the first recess 19 on the intake 5 determines the actual gap for the passage of air and consequently the size of the air flow through the passage hole 4.

When the nozzle 2 dispenses steam, in the first position of the adjustment element 6 there is the maximum intake of air inside the tubular structure 3 through the intake hole 4, in the second position there is the minimum intake of air and in the third position there is no intake of air.

The sleeve 7 also has a mark indicating the direction of actuation according to the type of drink desired on its outer side surface (for example a double vertical arrow with the word "cappuccino" at a point of the double arrow, and with the words "hot milk" at the other point of the double arrow, and with the words "cappuccino with little froth" at the centre of the double arrow).

In this case the sleeve 7 has a projecting grip tab 22 on its outside so that it can be actuated in rotation.

We shall now once again refer to all of the preferred embodiments of the finding.

Advantageously, in the tubular structure 3 the mixing of milk and air takes place in a first area that is distinct from a second area in which the emulsion of milk, air and steam coming out from the dispensing nozzle 2 takes place.

For this purpose, the tubular structure 3 has, close to the outlet hole 23 of the nozzle 2, an inclined plane 24 that in turn has a first milk entry passage 25 and a second passage 26 for the outlet of the emulsion that has formed with milk, air and steam.

In particular, the amount of milk taken in, through the first entry passage 25, takes place substantially in the opposite direction to that in which the air passes from the channel 27, so as to cause an optimisation of the two elements caused precisely by their coming in two substantially aligned opposite directions. Indeed, the first air and milk mixing area is located close to the first passage 25 for milk inside the tubular element 3, whereas the second area of emulsion of milk with air and steam is close to the second passage 26 for the outlet of the emulsion that is thus formed in an area distinct from that where milk and air are mixed.

Moreover, advantageously, the first and second passage 25 and 26 are positioned at different heights with respect to the axis of the tubular structure 3.

In this way the mixing and emulsifying of the various components do not interfere with each other, so that the single processes are optimised.

Moreover, the particular structure that is made allows the emulsion to come out in a direction axial to the extension of the tubular element 3 and not countered by any reduction in width of the outlet passage 26 that can be made of substantial width.

The process for the formation of froth consists of passing steam inside the nozzle 2, to thus achieve a depression inside the tubular element 3 suitable for drawing an amount of air and milk inside it.

Advantageously, the air and milk drawn inside the tubular element 3 are mixed in a first area thereof, whereas the emulsion of the air and milk mixture thus obtained with the steam takes place in a second distinct area of the tubular element 3 that is closer to its outlet.

Lastly, advantageously, the emulsion of milk, air and steam thus obtained is discharged from the outlet present in the tubular element in a direction substantially aligned with the axis of the tubular element and substantially opposite the direction in which the milk is drawn inside it to carry out the mixing with air in the first area.

The amount of air in the emulsion depends upon the operative position of the adjustment element 6.

As seen, advantageously through the actuation of the adjustment element 6 it is possible to obtain a hot milk, a cappuccino or a cappuccino with little milk.

Of course, it is possible to foresee more than three operative positions of the adjustment element 6 in the case in which finer adjustment of frothing is necessary.

The device for the formation of froth in a milk-based drink thus conceived can undergo numerous modifications and variants, all covered by the inventive concept; moreover, all of the details can be replaced by technically equivalent elements.

In practice, the materials used, as well as the sizes, can be whatever according to the requirements and the state of the art.

The invention claimed is:

1. A device for the formation of froth in a milk-based drink, comprising:
   a steam dispensing nozzle;
   a tubular structure, the steam dispensing nozzle inserted into and removeably connected to the tubular structure so that the tubular structure surrounds the steam dispensing nozzle, the tubular structure comprising an open top, an open bottom, an outer wall and an air inlet hole formed in and extending through the entire thickness of the outer wall;
   a sleeve disposed around the outer wall of the tubular structure, the sleeve comprising an inner surface that defines an air intake passageway with the outer wall of the tubular structure; and
   an adjustment element formed on the inner surface of the sleeve, the sleeve being adjustable relative to the tubular structure between a first position in which the adjustment element at least partially overlaps the air inlet hole and a second position in which the adjustment element is staggered from the air inlet hole so that flow of air through the air inlet hole may be adjusted independently from a flow of milk, wherein
   said tubular structure is formed with a first area inside said tubular structure provided for mixing of milk and air, said first area being distinct from a second area provided for an emulsion of milk, air and steam coming out from said dispensing nozzle,
   said nozzle has an outlet hole and said tubular structure includes near to the outlet hole of said nozzle, a wall that forms a continuous plane within which is formed a first opening for intake of milk and a second opening for outlet of an emulsion that has formed from milk, air from said air passageway and steam,
   the second opening is downstream from the outlet hole of the nozzle, and
   the first opening and the nozzle outlet are positioned at different heights of an axis of the tubular element.

2. The device according to claim 1, characterised in that a portion of said air passageway has a variable section.

3. The device according to claim 1, characterised in that a portion of said air passageway has a substantially triangular section.

4. The device according to claim 1, wherein said air passageway extends longitudinally parallel to an axis of said tubular structure and said tubular structure has a guide supporting and guiding said sleeve in translation parallel to said axis.

5. The device according to claim 4, characterised in that said sleeve has an outer surface with a grip knurling so that it can be actuated in translation.

6. The device according to claim 1, wherein said air intake hole extends circumferentially to an axis of said tubular structure and said tubular structure has a guide supporting and guiding said sleeve in rotation about said axis.

7. The device according to claim 6, characterised in that said sleeve has an outer surface with a projecting grip tab so that the sleeve can be actuated in rotation.

8. The device according to claim 1, characterised in that said sleeve is elastically deformable and connected through pressure fitting to said tubular structure.

9. The device according to claim 8, characterised in that said sleeve is made from elastomer.

10. The device according to claim 8, characterised in that said sleeve has an inner surface with an inner recess, said inner recess having an annular stiffening band.

11. The device according to claim 1, further comprising a mark on an outer surface of said sleeve indicating a direction of actuation.

12. Coffee machine characterized in that it has a device for the formation of froth according to claim 1.

13. Device for formation of froth in a milk-based drink according to claim 1 wherein said tubular structure has a sleeve with an inner cavity that forms part of said air passageway and said air flow adjustment element is movable to selectively block said inner cavity to control said air flow.

* * * * *